F. E. LAKE.
MOTOR VEHICLE.
APPLICATION FILED JULY 24, 1907.

989,615.

Patented Apr. 18, 1911.

2 SHEETS—SHEET 2.

UNITED STATES PATENT OFFICE.

FRANK E. LAKE, OF GUADALAJARA, MEXICO.

MOTOR-VEHICLE.

989,615.  Specification of Letters Patent.  Patented Apr. 18, 1911.

Application filed July 24, 1907. Serial No. 385,392.

*To all whom it may concern:*

Be it known that I, FRANK E. LAKE, a citizen of the United States, and a resident of Guadalajara, in the State of Jalisco, Mexico, have invented certain new and useful Improvements in Motor-Vehicles, of which the following is a description.

My invention relates to motor vehicles.

One of the greatest objections to the ordinary automobile is that the operation of the motors is accompanied by a considerable amount of jarring and vibration.

One of the objects of my invention is to provide a construction which will reduce such jarring and vibration to a minimum, and I accomplish this end by a novel arrangement of the motors and of the fly wheel, with respect to the machine frame.

Among the other objects of my invention are the provision of a novel clutch mechanism, and the provision of an improved means by which access may readily be had to the crank cases of the motors.

Figure 1:
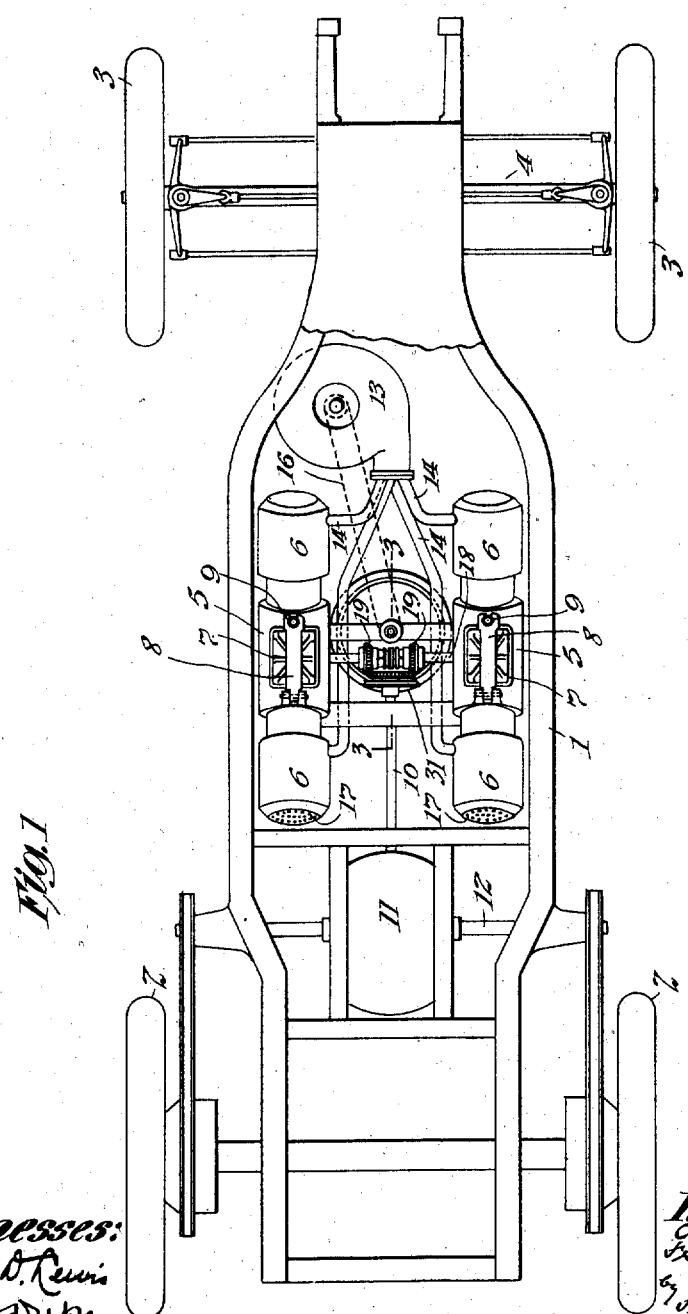
Figure 2:
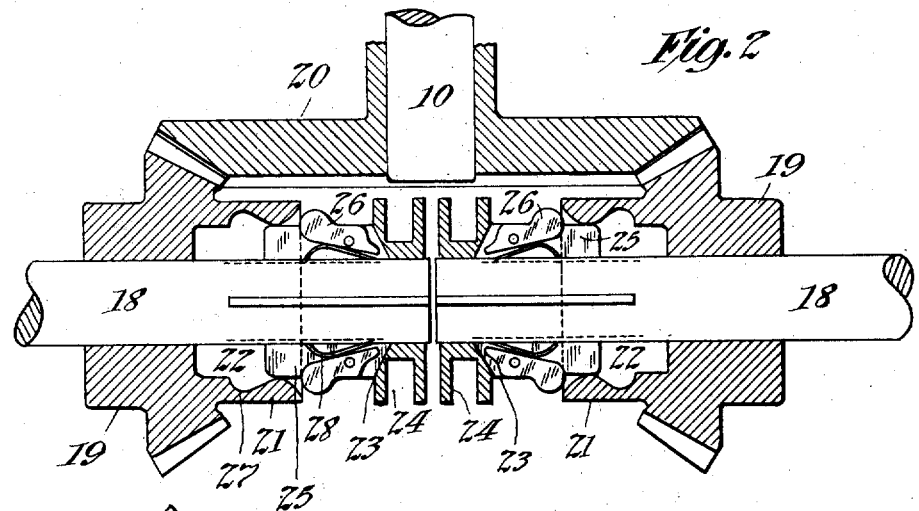
Figure 3:
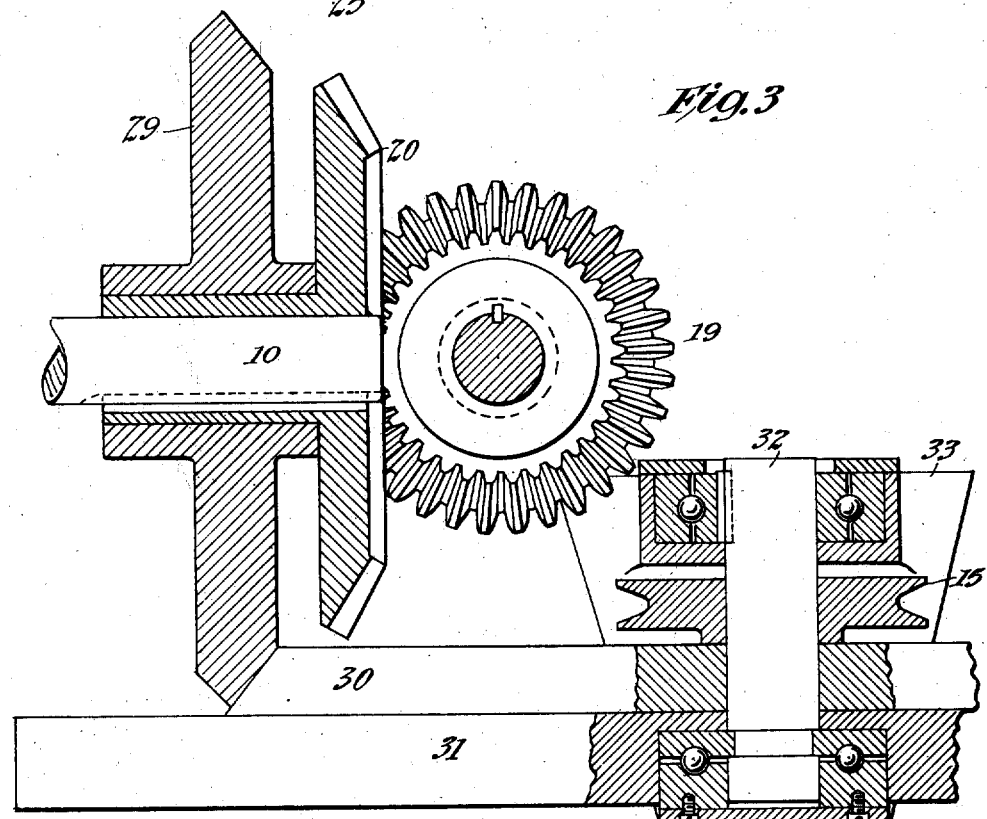

In the drawings forming a part of this specification and wherein the same characters of reference are used to indicate the same parts throughout, Figure 1 is a plan view of an automobile chassis showing the relation of the various motive parts to the machine frame; Fig. 2 is a cross-sectional view showing the clutches by which the motors may be connected with the main shaft, and Fig. 3 is a view, showing the fly-wheel and fly-wheel actuating mechanism, partly in cross-section, and partly in elevation, the cross-sectional part thereof being taken on the line 3—3 of Fig. 1.

The machine frame is indicated by the reference numeral 1, and is provided with the usual drive wheels 2—2 and front wheels 3—3. The forward part of the frame is narrowed to provide room in which the forward wheels may turn at an unusually great angle and a novel form of steering gear 4 is provided, which, however, is not claimed herein, it being made the subject of a separate application filed contemporaneously with this application.

In order to distribute the vibration due to the motors to the greatest possible extent, and therefore make it as nearly imperceptible as possible, I provide a motor 5 on each side of the longitudinal center of the vehicle frame, and these motors I place at substantially the middle of the machine from front to rear. The type of motor, which is preferably used is a gasolene engine of the opposed cylinder type and of the well-known V form, the cylinders, however, being placed nearly in a straight line so that the angle between them approximates very closely to 180 degrees. By this arrangement all the advantages of the V type of gasolene motor may be obtained, and at the same time the motor takes up very little room vertically. Motors whose opposed cylinders are placed in the same straight line could, of course, be used within the scope of my invention. One of the cylinders of each engine is placed in front of the transverse center line of the vehicle frame, and the other at the rear thereof, the rear cylinder being at substantially the same distance from the rear wheels as the forward cylinder is from the front wheels. If an automobile constructed in the manner I have described were to be cut longitudinally and transversely into quarters, one of the cylinders of the engine would be situated in each of these quarters. It is apparent that the arrangement of the motors in this fashion with respect to the machine frame will distribute and reduce the vibration attendant upon their operation. It is to be understood, of course, that when I speak of one of the cylinders of a gasolene motor of the V type, I mean one of the units on each leg of the V, which unit may obviously be made up of any desired number of individual cylinders. In the drawings the engines are indicated at 5 and their cylinders at 6. Upon the crank cases of the engines I provide hand hole plates 7 which are held in place by pivoted bars 8 secured to the crank cases by bolts 9. By this construction I am enabled, upon removing the single bolt 9 to throw back the pivoted bar 8 whereupon the hand hole plate 7 may be removed without any further trouble. This arrangement obviates the common necessity of removing several bolts before access can be had to the interior of the crank case.

The main shaft of the automobile is shown at 10 and it is connected by any common form of transmission gearing contained in the box 11 to the driving shaft 12 whence power applied to the shaft 10 is transmitted through sprockets to the rear wheels 2. About the cylinders 6 of the engines are placed jackets which are connected to a fan 13 by pipes 14. This fan, which is driven from a pulley 15 on the fly wheel shaft by a pulley cord 16, forces air through the pipes 14 and the cylinder jackets and out through perforations 17 at the ends of the cylinder jackets most remote from the fan 13.

In order to throw the engines into and out of gear with the driving shaft, I have provided the clutch mechanism which will now be described.

Upon the shafts 18 of the motors 5, are provided loose running bevel gears 19 which continuously mesh with a gear 20 upon the main shaft 10. The engines upon the two sides of the machine are run in opposite directions so that each will actuate the shaft 10 to turn in the same direction. The gears 19 are provided with inwardly extending hubs 21 in which are formed recesses 22 surrounding the shafts 18. Sliding sleeves 23, provided at one end with grooves 24, for connection with a suitable actuating member, such as a forked lever or the like, (not shown) are splined on the shafts 18, and fit within the recesses 22 in the gears 19. In slots 25 in these sleeves are pivoted friction members 26 which are normally thrust outward by powerful springs 28. Within the recesses 22 in the hubs 21 are grooves 27 in which the friction members 26 are received. When a sleeve 23 is forced within the corresponding recess 22 by the actuating device applied to the groove 24, the friction members 26 coming into contact with the beveled mouth of the recess 22 will be pushed into their slots 25, and as the sleeve 23 moves farther along these friction members will be thrust outward by the springs 28, and will contact with the bottom of the groove 27. The gear 19 will now be driven by the rotating shaft 18. It will be understood that either or both or neither of the motors may thus be clutched in to actuate the gear 20 on the main shaft as desired.

Sweated upon or otherwise secured to the hub of the gear 20, is a beveled friction wheel 29 which actuates a similar friction wheel 30 which is secured to and forms a part of the fly wheel 31. The said fly wheel is mounted upon a short vertical shaft 32, which is mounted in suitable ball bearings in crosspieces 33 and 34 which form a part of the vehicle frame. This fly wheel, which is situated between and below the motors and at substantially the center of the vehicle frame increases the stability of the vehicle both by lowering the center of gravity and by its resistance to any change in the plane of its rotation in which respect it operates upon the well-known principle of the gyroscope.

I claim:

1. In a motor vehicle, the combination with a vehicle frame provided with driving wheels, of two motors, one disposed at either side of the longitudinal central line of the said frame, and at substantially its middle, each motor being made up of two units, one disposed in front and the other back of the middle transverse line of the vehicle frame, interconnecting gearing between the motors and the driving wheels, a horizontal fly wheel beneath said motors, and connections between said fly wheel and said intermediate gearing, substantially as set forth.

2. In a motor vehicle, the combination of a vehicle frame, driving wheels on said frame, of two motors, each comprising a shaft and each made up of two units, the said motor shafts being in alinement and extending transversely of the frame, substantially midway between the ends thereof, one of the units of each motor being placed forward of the motor shaft and the other being placed rearward thereof, the interconnecting gearing between the motor shafts and the drive wheels, a horizontal fly wheel beneath said motors, and connections between said fly wheel and said intermediate gearing, substantially as set forth.

3. In a motor vehicle, the combination with a vehicle frame and drive wheels, of two gasolene motors of the opposed cylinder type, the said opposed cylinders of each motor being provided with a common crank shaft, the shafts being placed in line with one another, and transversely of the vehicle frame, substantially midway between its ends, interconnecting gearing between said motor shafts and the drive wheels, a horizontal fly wheel beneath said motors, and connections between said fly wheel and said intermediate gearing, substantially as set forth.

4. In a motor vehicle, the combination with a vehicle frame and drive wheels, of two motors each of which is made up of two units, one of the motors being placed on each side of a central longitudinal line of the said frame, and one of the units of each motor being on each side of the central transverse line through the said frame, a main shaft connected to the drive wheels, connections between said shaft and motors, a horizontal fly wheel beneath said motors, and connections between said shaft and fly wheel, substantially as set forth.

This specification signed and witnessed this 5th day of July, 1907.

FRANK E. LAKE.

Witnesses:
Luis Cuesta,
L. Angel Morales.